United States Patent
Betts et al.

(10) Patent No.: US 7,634,036 B2
(45) Date of Patent: *__Dec. 15, 2009__

(54) SYSTEM AND METHOD FOR DERIVING SYMBOL TIMING

(75) Inventors: William Lewis Betts, St. Petersbury, FL (US); Rafael Martinez, Clearwater, FL (US)

(73) Assignee: Summit Technologies Systems, LP, Bala Cynwyd, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/774,810

(22) Filed: Jul. 9, 2007

(65) Prior Publication Data

US 2008/0056425 A1 Mar. 6, 2008

Related U.S. Application Data

(63) Continuation of application No. 11/051,440, filed on Feb. 4, 2005, now Pat. No. 7,248,662, which is a continuation of application No. 09/660,346, filed on Sep. 12, 2000, now Pat. No. 6,853,695.

(60) Provisional application No. 60/161,799, filed on Oct. 27, 1999.

(51) Int. Cl.
*H04L 7/00* (2006.01)
*H04L 25/00* (2006.01)
*H04L 25/40* (2006.01)

(52) U.S. Cl. .................. 375/371; 375/229; 375/232; 375/233; 375/234

(58) Field of Classification Search ......... 375/229–236, 375/371

See application file for complete search history.

(56) References Cited

U.S. PATENT DOCUMENTS

| | | | |
|---|---|---|---|
| 4,532,640 A | 7/1985 | Bremer et al. | |
| 4,940,977 A | 7/1990 | Mandell | |
| 5,426,671 A * | 6/1995 | Bergmans | 375/354 |
| 6,396,884 B1 * | 5/2002 | Maruyama | 375/344 |
| 6,853,695 B1 * | 2/2005 | Betts et al. | 375/371 |
| 7,248,662 B2 * | 7/2007 | Betts et al. | 375/371 |

* cited by examiner

*Primary Examiner*—Curtis B Odom
(74) *Attorney, Agent, or Firm*—Woodcock Washburn, LLP

(57) ABSTRACT

A symbol timing derivation system derives receiver timing from received symbols which avoids the need for a pilot tone, thereby reducing power consumption and expanding usable bandwidth. The system is implemented by using a calculation that finds the timing phase error. The timing phase error is then averaged and controls a phase locked loop (PLL). This PLL in turn controls a voltage-controlled oscillator, which handles the modem receiver timing. A centroid calculation can be included to bias the voltage-controlled oscillator to push the equalizer coefficients back to the ideal position. The system can be implemented in either a point-to-point modem environment or a multi-point environment, for example, but not limited to, MVL or DMT. The voltage-controlled oscillator may also be implemented to control transmitter timing, so that the central office modem and the remote modem will operate more-or-less synchronously, reducing the need for large equalizer corrections at either end.

35 Claims, 4 Drawing Sheets

SYSTEM AND METHOD FOR DERIVING SYMBOL TIMING

CROSS REFERENCE TO RELATED APPLICATIONS

This application is a continuation of U.S. Utility application Ser. No. 11/051,440, filed Feb. 4, 2005, which is a continuation of U.S. Utility application Ser. No. 09/660,346, filed Sep. 12, 2000, and which claims priority to and the benefit of U.S. Provisional Application No. 60/161,799, filed Oct. 27, 1999, each of which is incorporated by reference herein.

TECHNICAL FIELD OF THE INVENTION

The present invention generally relates to modem communications, and more particularly to a system and method for deriving symbol timing in modems.

BACKGROUND OF THE INVENTION

In recent years there has been an exponential expansion in the Internet and in the number of people who want to connect to the Internet. Businesses have found the Internet a cheap and efficient way of communicating information to their customers, to their suppliers, and even among their own workforce. Employees exposed to the Internet at work have gone in search of tools to connect the personal computers they have at home to the Internet so that they can have access to the vast resources they have become accustomed to at work.

The modem has filled this need for the past twenty years, but in the past ten years it has seen unprecedented advances in technology. With the advent of the World Wide Web associated with the Internet, engineers have consistently needed to push larger and larger amounts of data through a pipeline that has not really grown. In the past few years, with demand growing for "real-time" networks, designers have started to develop alternatives to the traditional modem after deciding that traditional modems most likely had a top speed around 56 Kbps. These include digital subscriber line (DSL) modems, integrated services digital network (ISDN), and cable modems.

DSL modems in particular have received a lot of attention recently. DSL modems operate at higher data rates through a combination of higher frequency transmission and by using mapping techniques to map a series of bits onto a single symbol. These techniques typically require that both the transmitter and receiver are in sync with each other. When the systems are not in sync, either or both of the receivers are looking at an incorrect portion of the signal. In such a situation, the systems are likely to see an incorrect phase angle or an incorrect magnitude, and the data ends up being misinterpreted.

In the past, synchronization has been done either through the use of a preamble, the use of an off frequency pilot tone or analysis of band edge signals. Using the preamble method, a known set of data is transmitted at the beginning of each transmission, and the receiver looks for this set of data and determines the characteristics of the transmission. The pilot tone method on the other hand, transmits a constant pattern of data (pilot tone) offset from the carrier frequency, thus allowing the receiver to derive the timing information from the pilot tone even in the absence of modulated data. The band edge method filters the signal at each edge of the modulated bandwidth then performs non-linear operations to measure the bandwidth or symbol rate. Each of these systems has certain disadvantages.

SUMMARY OF THE INVENTION

The present invention involves an improvement to a receiver of a modem in a half-duplex multi-point or point-to-point system or full duplex system that enables elimination of both the pilot tone and the preamble by deriving the symbol timing directly from the equalized or demodulated symbols. By employing the present invention, modems are able to derive the incoming symbol timing from the received symbols. By deriving the symbol timing dynamically, the modem will conserve power over the pilot tone and make special start up preamble signals unnecessary, thereby reducing the time required to communicate data.

When the symbol timing derivation system is used in a multiple virtual lines (MVL) system, as an example, the invention uses a forward equalizer to clean up the signal, then the frequency is locked and the phase corrector rotates the constellation to the correct orientation for the slicer. The discrete data symbol produced by the slicer, which may include advanced data recovery techniques, is then rotated back into its original orientation and subtracted from the pre-sliced signal and sent back to the forward equalizer to update the equalizer coefficients.

However, the invention can also be applied to, as another example, discrete multi-tone (DMT) systems, by using the received symbols to derive symbol timing. Here the symbol timing derivation system is very similar, but does not include a decision feedback equalizer or a centroid error calculation, and replaces the non-linear decoder with a discrete Fourier transform (DFT) and a switch to handle the numerous carriers present in DMT.

The receiver includes a voltage controlled crystal oscillator (VCXO) which controls receiver timing and could allow the remote modems to transmit to the control modem using a time base that is in sync with the received symbol timing. This reduces the need for timing correction or tracking in the equalizers at either end of the line.

The present invention can also be conceptualized as providing a method for communication in a modem. This method can be broadly summarized by the steps of: decoding a received signal segment into a discrete data symbol, calculating a timing phase error and an average timing phase error based upon the received signal segment and discrete data symbol, creating a control signal based upon the average timing phase error, and generating symbol timing for a receiver based upon the control signal.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

This invention can be better understood with reference to the following drawings. The components in the drawings are not necessarily to scale, emphasis instead being place on clearly illustrating the principles of the present invention. Moreover, in the drawings, like reference numerals designate corresponding parts throughout the several views.

DETAILED DESCRIPTION OF THE PREFERRED EMBODIMENT

Figure 1A:
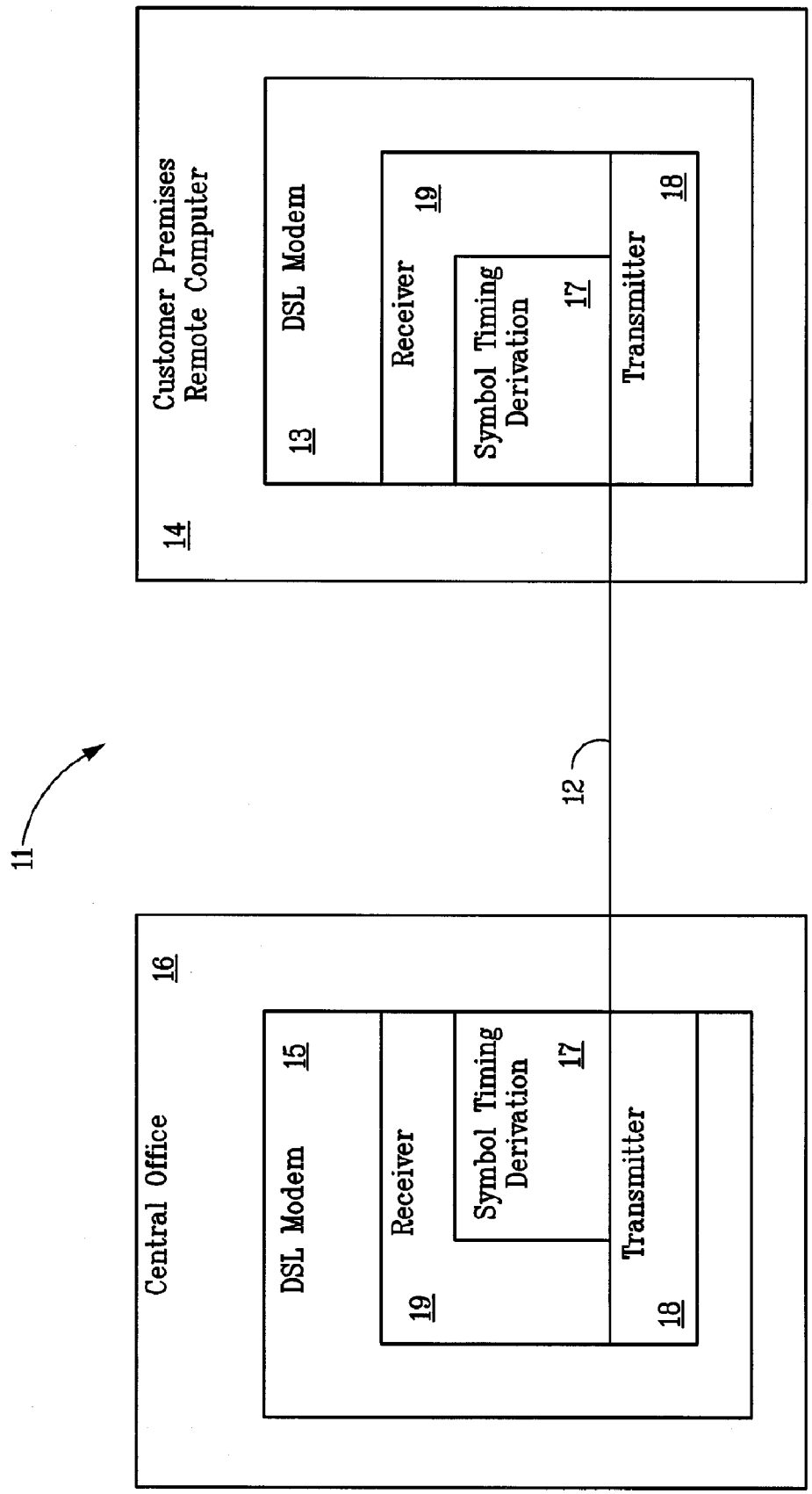
FIG. 1A is a block diagram of a first embodiment of the symbol timing derivation system of the present invention, which is situated in a DSL modem of a point to point system.

FIG. 1A shows a schematic view illustrating a point-to-point communications system 11 in which modems 13, 15, employing the concepts and features of a symbol timing derivation system, are used. Remote computer 14 and its DSL modem 13 is connected to a central office (CO) 16 via communications channel 12. Located at a central office 16, is DSL modem 15. The channel 12 can be a wire or wireless link, but is typically, although not necessarily, the copper wire pair that extends between a telephone company central office and a remote residential business, or any other location served by local telephone service. Remote computer 14 can be located at a residence, business, or any other location served by conventional copper wire pair where DSL modems 13, 15 may currently be used. By using modem 15 and modem 13 employing the concepts and features of the symbol timing derivation system 17, it is possible to derive symbol timing without the use of a symbol preamble or pilot tone. This feature allows both modems 13, to maintain synchronization with each other, and advantageously conserve energy while maximizing data rate.

Figure 1B:
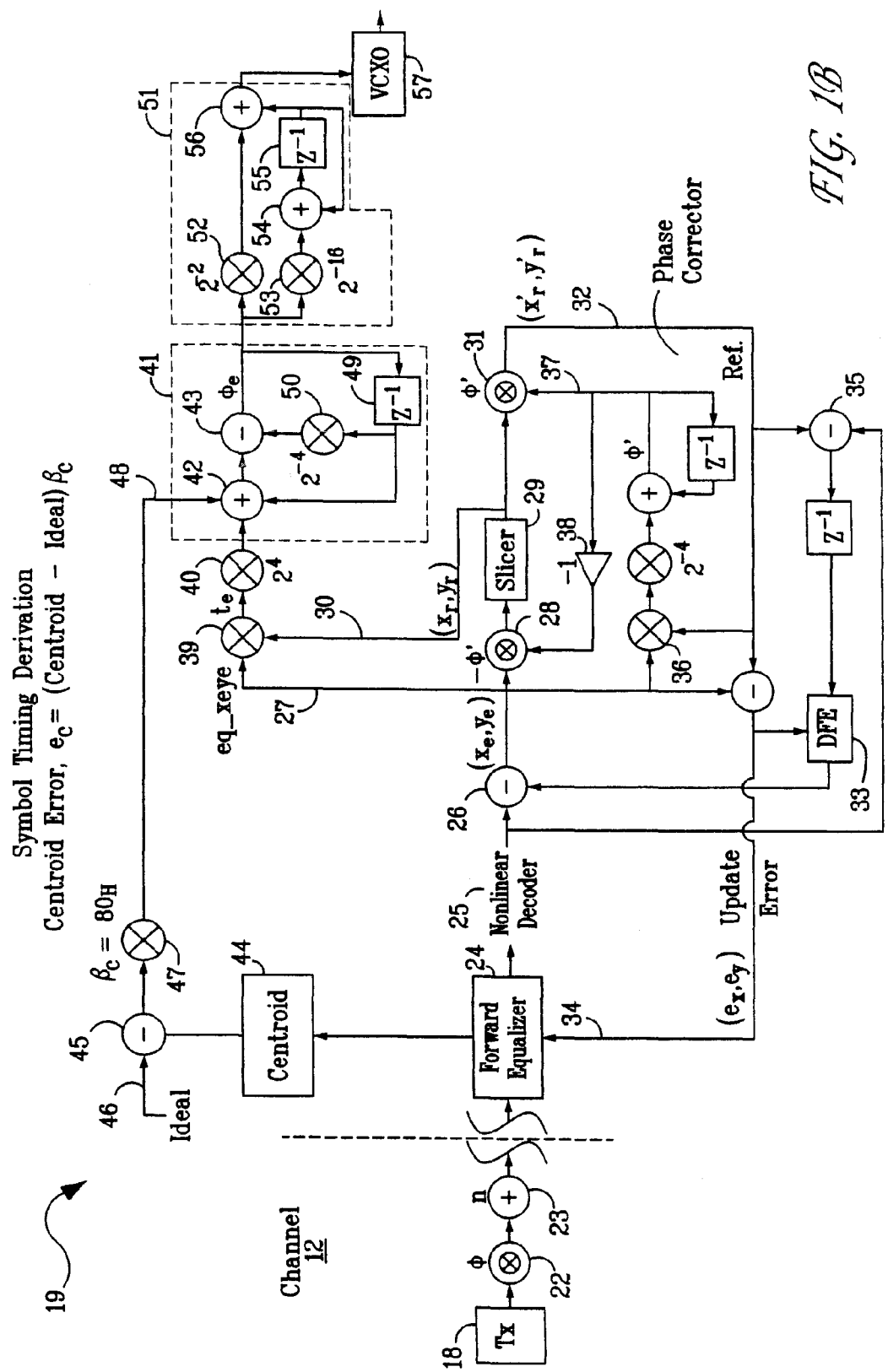
FIG. 1B is a schematic diagram of the first embodiment of FIG. 1A.

Now referring to FIG. 1B, shown is a schematic view illustrating the symbol timing derivation system 17 belonging to DSL modem 13 and/or DSL modem 15 of FIG. 1A including the concepts of the present invention. The transmitter 18 of modem 15 first transmits a signal across the channel 12, which is modeled here by the addition of a phase rotation 22, φ, and additive noise 23, n, from the line, to the receiver 19 of a remote modem 13. This embodiment of the symbol timing derivation system 17 begins with the forward equalizer 24. The forward equalizer 24 takes the incoming signal and uses its coefficients to clean up the signal by removing intersymbol interference and reducing signal noise.

Once the forward equalizer 24 has adjusted the signal, the symbol timing derivation system 17 allows for a non-linear decoder 25, the use of which is described in U.S. Pat. No. 5,265,127 to Betts, et al. which is hereby incorporated by reference. The non-linear decoder 25, however, is not included in the preferred embodiment. When operating in a discrete multi-tone (DMT) system, which is well known in the art, this non-linear decoder block 25 would be replaced by a Discrete Fourier Transform (DFT) producing numerous outputs in the frequency domain. These numerous outputs correspond to the different multi-tone carrier frequencies of the received signal. A switch controls which carrier is fed into the symbol timing derivation system 17 at any instant in time.

In the next step, the results of the decision feedback equalizer 33 are subtracted 26 from the incoming signal. This step allows the receiver to subtract 26 from the signal any past signals that may have seen time dispersion as a result of the channel. The resulting signal, eq_xeye 27, is then fed to three different components.

The first component to be discussed will be the slicer 29. The signal, eq_xeye 27, is first phase rotated by $-\phi'$ 28. This phase rotation 28 puts the constellation in the correct (squared up) orientation for the slicer 29, so that the slicer 29 does not misinterpret the signal as being in an incorrect decision region due to phase error. The slicer 29 then decides where the constellation point lies. Additionally, any advanced data recovery techniques, such as well known trellis coding, may be applied in the slicer 29. The slicer 29 then produces a reference signal 30 in the form of a discrete data symbol, which locates the constellation point at the center of a decision region. It should be appreciated that the above description of a slicer 29 should not limit the symbol timing derivation system 17 to operate only on quadrature amplitude modulated systems. The slicer 29 should be interpreted as a decision function in any modulation technique to decide where a signal should be interpreted to be located, including any amplitude shift keying, phase shift keying, or frequency shift keying techniques, or any combination thereof. The reference signal 30 is then phase rotated 31 back to its original orientation. The resultant signal 32 then updates the decision feedback equalizer (DFE) 33 and the phase corrector 36, although when operating in DMT, the symbol timing derivation system 17 could operate without a DFE 33. Even in DMT though, the symbol timing derivation system 17 can benefit from the inclusion of a noise whitening DFE 33 to further refine the signal.

The inputs to the DFE 33 include the sliced signal $(X'_r, Y'_r)$ 32, minus the unsliced signal 27, which indicates the error present in the DFE compensated signal, and the sliced signal 32 minus the result of the forward equalizer 24 delayed by one cycle, which shows both channel dispersion and signal noise. The result of the sliced signal 32 minus the unsliced signal 27 also results in the update error 34, which is sent to the forward equalizer 24 to update its coefficients. With respect to the second input to the DFE 33, one skilled in the art will recognize that this subtraction 35 can also occur after the delay, with the caveat that the corresponding signal 32 needs to be properly synchronized. The DFE 33 in this embodiment is a noise whitening DFE 33, and decides what part of the signal is due to noise 23 from the channel 12 and subtracts 26 the noise 23 from the output of the forward equalizer 24.

The use of a phase corrector 36 is known in the art. An example of a phase corrector can be seen in U.S. Pat. No. 4,532,640 to Bremer et al., which is hereby incorporated by reference. The inputs to the phase corrector 36 consist of eq_xeye 27 and $(X'_r, Y'_r)$ 32. The phase corrector 36 multiplies the signals 27, 32 together and multiplies the result by $2^{-4}$, a scalar. The phase corrector 36 then combines the product to the previous result (e.g., integrates), sending the result 37, φ', to phase rotator 31 also to an inverter 38, which inverts the result 37 and sends it to phase rotator 28.

Finally, the eq_xeye signal 27 is used to derive the timing phase error. The equation for deriving the timing phase error is as follows:

$$t_e = y_e \cdot x_r - x_e \cdot y_r$$

where the result is the product of the constellation vector 27 and the reference vector 30. This result shows how much the eq_xeye 27 signal has rotated in relation to the ideal reference vector 30.

As is known in the art, the circuit may use the phase rotated vector $(X'_r, Y'_r)$ 32, to derive the timing phase error, the difference is that the phase corrector in such a circuit will be a 360 degree phase corrector. In contrast, the present embodiment utilizes a phase corrector 36 that can correct up to one radian of error.

Back to the present embodiment the timing phase error $t_e$ resulting from multiplier 39 is then multiplied by a scalar 40, $2^4$ in this embodiment, and is input to a leaky integrator 41 which calculates the average timing phase error. The other input to the leaky integrator 41 is communicated from the centroid error 48, where it is combined via adder 42 with the scaled timing phase error and integrated. It should be added that in DMT, there should be no centroid error calculation unless the DMT equalizer adaptively updates its coefficients.

The error is then calculated by sending the result of the centroid block 44 to a subtractor block 45, which subtracts the ideal signal 46 from the centroid. The centroid 44 may be the true centroid or the location of the largest magnitude equalizer coefficient. For a 36-coefficient equalizer, the ideal centroid 46 has been set at 19, which biases the equalizer to the high side of halfway. The subtraction result is then sent to a multiplication block 47, where it is multiplied by a scalar, $\beta_C$. In ideal conditions, the centroid error 48 will be zero. However, when the centroid error 48 becomes non-zero, the centroid error 48 biases the leaky integrator, and thus the VCXO 57, to compensate for the movement of the equalizer coefficients so that the coefficients will move back to the center, or ideal position. Without the centroid calculation 44, the equalizer coefficients can make a random walk to either extreme, at which point the equalizer 24 can no longer correct for additional error in the signal.

The result of adder 42 is then input to a subtractor 43 along with a scaled 50 version of the previous result delayed one cycle by the delay block 49. The result of the leaky integration 41 is as follows:

$$\phi e_n = (1-2^{-4})\phi e_{n-1} + e_c + 2^{+4} t_e$$

where $\phi e_n$ is the timing phase error, $\phi e_{n-1}$ is the previous timing phase error, $e_c$ is the centroid error 48, and $t_e$ is the timing error computed above.

The final portion of the symbol timing derivation system to be discussed is the voltage controlled crystal oscillator (VCXO) 57 control circuit 51. This circuit 51 is comprised of a second order phase locked loop (PLL) 51 which develops the control voltage for the VCXO 57. The timing phase error pen, output from the leaky integrator 41 described above, is split and fed into two different multipliers 52, 53. The first multiplier 52 multiplies the signal by the scalar $2^{-2}$, while the second multiplier 53 multiplies the signal by $2^{-16}$. The output of this second multiplier 53 is then fed to an ideal integrator, which is made up of a summation block 54 and a delay element 55. The output of the ideal integrator 54 is taken at the output of the delay element 55 and fed to a summation block 56, where it is added to the result of the first multiplier 52 to control the VCXO 57. The resulting equations are as follows:

$$\Delta f = \Delta f + 2^{-16} \phi e$$

and $$VCXO = 2^{-2} \phi e_n + \Delta f$$

where $\phi e$ is the timing phase error, and $\Delta f$ is the second order frequency offset.

Figure 2A:
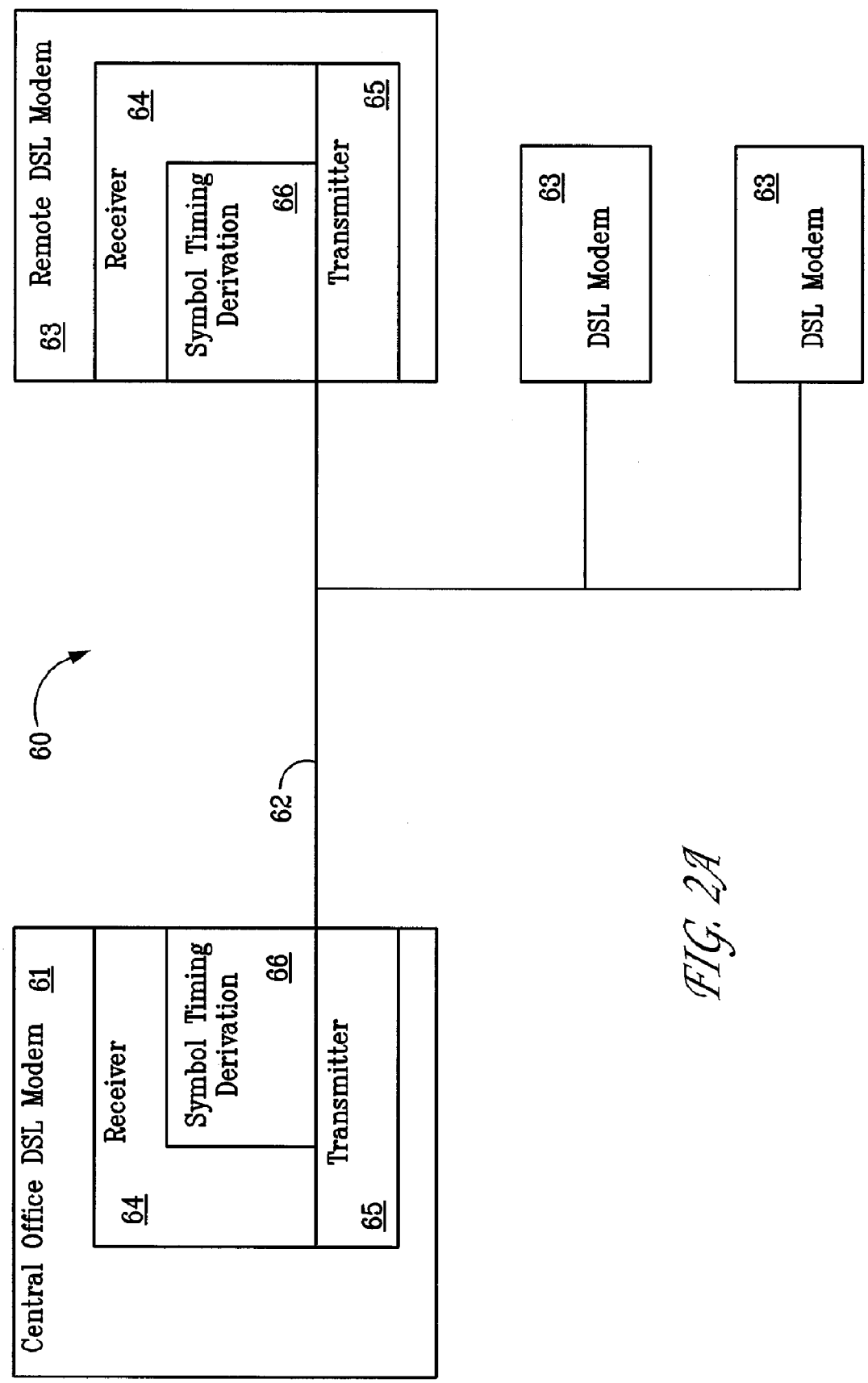
FIG. 2A is a block diagram of the second embodiment of the symbol timing derivation system of the present invention, which is situated in a multi-point system.
Figure 2B:
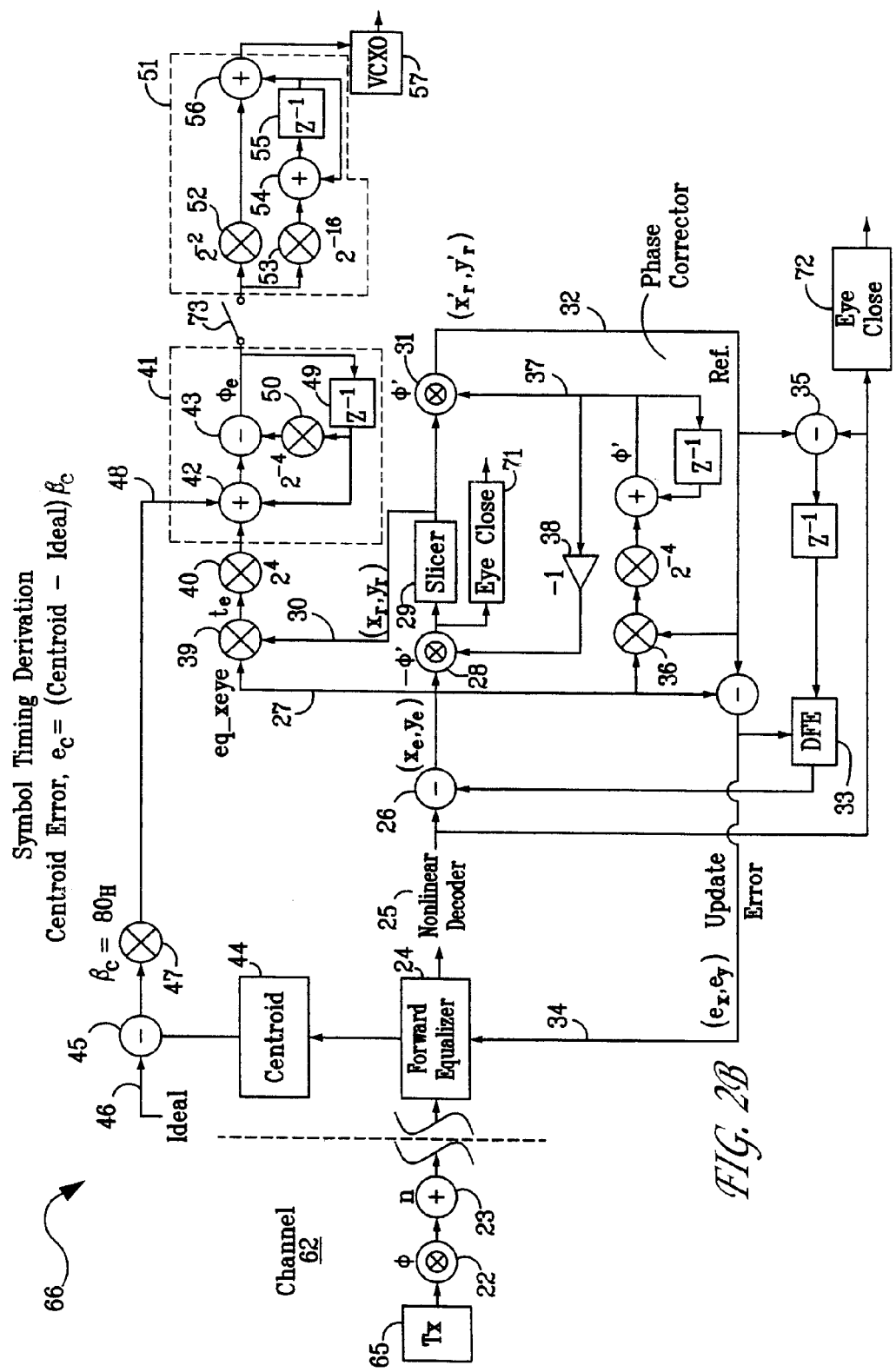
FIG. 2B is a schematic diagram of the second embodiment of FIG. 2A.

In an alternative embodiment shown in FIG. 2A, the symbol timing derivation system 66 is used in a multi-point system 60. FIG. 2A shows a central office DSL modem 61 with a transmitter 65 and a receiver 64, which contains the symbol timing derivation system 66, connected to many remote DSL modems 63, also equipped with a transmitter 65 and receiver 64, and containing the symbol timing derivation system 66. The symbol timing derivation systems 66 of these DSL modems 61, 63 are shown in FIG. 2B. The novelty here is the dual eye closure 71, 72. The eye closure functions 71, 72 sense when no signal is present and opens the flywheel switch 73. Prior to the present embodiment 66, DSL modems only included one eye closure 71. What prior embodiments did not consider, however, is that even when no signal is present, the DFE 33 might create a signal, thus eye close 71 might not realize that no signal is present. Therefore, a second eye close 72 was added to detect when no signal was present coming out of the forward equalizer 24. Eye close 71 is still used, though, because it takes advantage of both the DFE 33 for noise reduction, and the phase corrector 36, to rotate the signal back to the correct orientation. The eye closures 71, 72 may be used in point-to-point systems 11 running in full duplex, to correct for carrier dropout, but is normally used when running half duplex in either point-to-point 11 or multi-point systems 60 (e.g., a multiple virtual lines (MVL) system, as is described in U.S. Pat. No. 6,061,392 to Bremer et al., which is incorporated herein by reference).

The symbol timing derivation systems 17, 66 described above can be implemented in software, hardware, or a combination thereof. In the preferred embodiment, the elements of the symbol timing derivation systems 17, 66 are implemented in software that is stored in a memory and that configures and drives a suitable digital signal processor (DSP), a variety of which are well known in the art, situated in a modem. However, the foregoing software can be stored on any computer-readable medium for transport or for use by or in connection with any suitable computer-related system or method. In the context of this document, a computer-readable medium is an electronic, magnetic, optical, or other physical device or means that can contain or store a computer program for use by or in connection with a computer-related system or method.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A system to derive symbol timing for a receiver, the system comprising:
    a slicer configured to receive a signal segment from a communication channel and to decode the signal segment into a discrete data symbol as a reference signal;
    a calculator configured to compute a scaled average symbol timing phase error based upon the signal segment and the discrete data symbol;
    an integrator configured to integrate the scaled average symbol timing phase error;
    a symbol timing generator configured to produce symbol timing for the receiver based on the integrated scaled average symbol timing phase error;
    a forward equalizer; and
    a decision-feedback equalizer configured to receive the difference between a phase-corrected reference signal and the reference signal, and to receive a difference between the phase-corrected reference signal and a delayed output of the forward equalizer.

2. The system of claim 1, wherein the forward equalizer comprises a plurality of coefficients.

3. The system of claim 2, wherein the forward equalizer comprises a fractionally-spaced forward equalizer.

4. The system of claim 1, further comprising:
    a phase rotator configured to receive the discrete data symbol as the reference signal and to receive a phase-corrector angle φ', and further configured to produce the phase-corrected reference signal.

5. The system of claim 2, further comprising a centroid error calculator configured to produce a centroid error based on the plurality of coefficients, wherein the calculator is further configured to produce a symbol timing phase error based upon the received signal segment and the discrete data symbol, and to compute the scaled average symbol timing phase error based upon the symbol timing phase error and the centroid error.

6. The system of claim 5, wherein the calculator is further configured to add the centroid error to the scaled average timing phase error.

7. The system of claim 5, wherein the centroid error calculator has a fixed ideal value, and the centroid error calculator is further configured to produce the centroid error based on the plurality of coefficients and the fixed ideal value.

8. The system of claim 5, wherein the centroid error is the location of one of the plurality of equalizer coefficients with the largest magnitude.

9. The system of claim 1, further comprising:
a phase locked loop in communication with the integrator; and
a voltage controlled oscillator in communication with the phase locked loop.

10. The system of claim 1, wherein the communication channel is a wired subscriber loop.

11. The system of claim 1, wherein the communication channel is a wireless channel.

12. A method for deriving symbol timing for a receiver, the method comprising the steps of:
receiving a signal from a communication channel;
decoding the received signal into a reference symbol;
equalizing the received signal with a forward equalizer comprising a plurality of coefficients;
computing a scaled symbol timing phase error based upon based upon the signal and the reference symbol;
calculating a centroid of the coefficients; and
generating the symbol timing for the receiver based on a sum of the scaled symbol timing phase error and the centroid.

13. The method of claim 12, wherein calculating the centroid step further comprises the step of calculating the centroid of the coefficients based on the plurality of coefficients and a fixed ideal value.

14. The method of claim 12, wherein the computing step further comprises the step of creating a control signal based upon the scaled symbol timing phase error.

15. The method of claim 12, wherein the communication channel is a wired subscriber loop.

16. The method of claim 12, wherein the communication channel is a wireless channel.

17. A system to derive symbol timing comprising:
a transmitter in communication with a communication channel;
a receiver in communication with the communication channel, the receiver comprising:
a slicer configured to receive a signal segment from a communication channel and to decode the signal segment into a discrete data symbol as a reference signal;
a calculator configured to compute a scaled average symbol timing phase error based upon the signal segment and the discrete data symbol;
an integrator configured to integrate the scaled average symbol timing phase error;
a forward equalizer; and
a decision-feedback equalizer configured to receive the difference between a phase-corrected reference signal and the reference signal, and to receive a difference between the phase-corrected reference signal and a delayed output of the forward equalizer; and
a symbol timing generator.

18. The system of claim 17, wherein the symbol timing generator comprises:
a circuit configured to receive the integrated scaled average symbol timing phase error and configured to develop a control signal based upon the integrated scaled average symbol timing phase error; and
an oscillator configured to receive the control signal and configured to generate symbol timing for the receiver.

19. The system of claim 18, wherein the circuit comprises a phase locked loop.

20. The system of claim 17, wherein the communication channel is a wireless channel.

21. A system to derive symbol timing for a receiver, the system comprising:
a slicer configured to receive a signal segment from a communication channel and to decode the signal segment into a discrete data symbol;
a centroid error calculator configured to produce a centroid error;
a calculator configured to compute a scaled average symbol timing phase error based upon the signal segment, the discrete data symbol, and the centroid error;
an integrator configured to integrate the scaled average symbol timing phase error; and
a symbol timing generator configured to produce symbol timing for the receiver based on the integrated scaled average symbol timing phase error.

22. The system of claim 21, further comprising a forward equalizer having a plurality of coefficients.

23. The system of claim 22, wherein the forward equalizer comprises a fractionally-spaced forward equalizer.

24. The system of claim 22, further comprising:
a phase rotator configured to receive the discrete data symbol as a reference signal and to receive a phase-corrector angle φ', and further configured to produce a phase-corrected reference signal; and
a decision-feedback equalizer configured to receive the difference between the phase-corrected reference signal and the reference signal, and to receive the difference between the phase-corrected reference signal and a delayed output of the forward equalizer.

25. The system of claim 22, wherein the centroid error calculator is configured to produce the centroid error based on the plurality of coefficients.

26. The system of claim 21, wherein the calculator is further configured to add the centroid error to the scaled average timing phase error.

27. The system of claim 21, wherein the centroid error calculator has a fixed ideal value, and the centroid error calculator is further configured to produce the centroid error based on the plurality of coefficients and the fixed ideal value.

28. The system of claim 21, wherein the centroid error is the location of one of the plurality of equalizer coefficients with the largest magnitude.

29. The system of claim 21, further comprising:
a phase locked loop in communication with the integrator; and
a voltage controlled oscillator in communication with the phase locked loop.

30. The system of claim 21, wherein the communication channel is a wired subscriber loop.

31. The system of claim 21, wherein the communication channel is a wireless channel.

32. A system to derive symbol timing comprising:
a transmitter in communication with a communication channel;
a receiver in communication with the communication channel, the receiver comprising:
a slicer configured to receive a signal segment from a communication channel and to decode the signal segment into a discrete data symbol;
a centroid error calculator configured to produce a centroid error;
a calculator configured to compute a scaled average symbol timing phase error based upon the signal segment, the discrete data symbol, and the centroid error; and
an integrator configured to integrate the scaled average symbol timing phase error; and
a symbol timing generator.

33. The system of claim 32, wherein the symbol timing generator comprises:
a circuit configured to receive the integrated scaled average symbol timing phase error and configured to develop a control signal based upon the integrated scaled average symbol timing phase error; and
an oscillator configured to receive the control signal and configured to generate symbol timing for the receiver.

34. The system of claim 33, wherein the circuit comprises a phase locked loop.

35. The system of claim 32, wherein the communication channel is a wireless channel.

* * * * *